(12) United States Patent
Jain et al.

(10) Patent No.: US 8,677,303 B2
(45) Date of Patent: Mar. 18, 2014

(54) ELECTROMIGRATION COMPENSATION SYSTEM

(75) Inventors: Palkesh Jain, Bangalore (IN); Young-Joon Park, Plano, TX (US)

(73) Assignee: Texas Instruments Incorporated, Dallas, TX (US)

(*) Notice: Subject to any disclaimer, the term of this patent is extended or adjusted under 35 U.S.C. 154(b) by 387 days.

(21) Appl. No.: 12/900,464

(22) Filed: Oct. 7, 2010

(65) Prior Publication Data

US 2011/0080175 A1 Apr. 7, 2011

Related U.S. Application Data

(60) Provisional application No. 61/249,402, filed on Oct. 7, 2009.

(51) Int. Cl.
*G06F 17/50* (2006.01)

(52) U.S. Cl.
USPC ........... 716/132; 716/112; 716/133; 716/134; 716/135; 716/122; 716/123

(58) Field of Classification Search
USPC .................. 716/112, 122–123, 132–135
See application file for complete search history.

(56) References Cited

U.S. PATENT DOCUMENTS

| 6,311,315 | B1 * | 10/2001 | Tamaki | 716/124 |
| 6,634,013 | B2 * | 10/2003 | Shinzawa | 716/115 |
| 7,346,869 | B2 * | 3/2008 | Tai et al. | 716/120 |
| 7,480,874 | B2 * | 1/2009 | Banoo et al. | 716/112 |
| 7,752,582 | B2 * | 7/2010 | Jain et al. | 716/107 |
| 8,219,953 | B2 * | 7/2012 | Jain et al. | 716/115 |
| 8,438,519 | B2 * | 5/2013 | Park | 716/115 |
| 2002/0107675 | A1 * | 8/2002 | Shinzawa | 703/2 |
| 2009/0031264 | A1 * | 1/2009 | Rittman et al. | 716/5 |

* cited by examiner

*Primary Examiner* — Naum Levin
(74) *Attorney, Agent, or Firm* — John R. Pessetto; Wade J. Brady, III; Frederick J. Telecky, Jr.

(57) ABSTRACT

An integrated circuit is described. The integrated circuit, comprising: a central processor; a memory; and an electromigration compensation system associated with a plurality of leads within the integrated circuit, wherein the electromigration compensation system causes the plurality of leads to have interlocking, horizontally tapered ends that substantially reduces electromigration divergence and consequently lead resistance and circuit shorting.

3 Claims, 7 Drawing Sheets

$$jeff \sim \frac{via \quad node \quad variables}{w \quad min \quad .actual}$$

$$w_{min.req} = \frac{jeff_{actual}}{jeff_{.threshold}}$$

| VIA NODE CURRENT DENSITY (e.g.) | THRESHOLD (ALLOWED, e.g.) | SEVERITY OF VIOLATION (NEW WMIN) | REQUIRED WIDTH OF 1st SEGMENT | REQUIRED WIDTH OF 2nd SEGMENT | REQUIRED WIDTH OF 3rd SEGMENT | REQUIRED WIDTH OF 4th SEGMENT |
|---|---|---|---|---|---|---|
| 10 | 10 | 1 | w | 2w | 3w | 4w |
| 15 | 10 | 1.5 | 1.5w | 2w | 3w | 4w |
| 25 | 10 | 2.5 | 2.5w | 2.5w | 3w | 4w |
| 35 | 10 | 3.5 | 3.5w | 3.5w | 3.5w | 4w |
| 45 | 10 | 4.5 | 4.5w | 4.5w | 4.5w | 4.5w |

545

ELECTROMIGRATION COMPENSATION SYSTEM

CROSS REFERENCE TO RELATED APPLICATION(S)

The present application claims priority to jointly owned U.S. Provisional Patent Application corresponding to application No. 61/249,402 entitled, "Vector Based EM Checking Automation Methodologies." This provisional application was filed on Oct. 7, 2009. The present application relates to jointly owned U.S. Pat. No. 8,438,519 issued May 7, 2013 entitled, "Via-Node-Based Electromigration Rule-Check Methodology."

DESCRIPTION OF RELATED ART

With the evolution of electronic devices, there is a continual demand for enhanced speed, capacity and efficiency in various areas including electronics. With this quest for efficiency, there corresponding reduction in wire sizes, while increasing the number of interconnections on an integrated circuit. Consequently, there remain unmet needs relating to interconnect failures.

BRIEF DESCRIPTION OF THE DRAWINGS

The electromigration compensation system may be better understood with reference to the following figures. The components within the figures are not necessarily to scale, emphasis instead being placed upon clearly illustrating the principles of the invention. Moreover, in the figures, like reference numerals designate corresponding parts or blocks throughout the different views.

Figure 1:
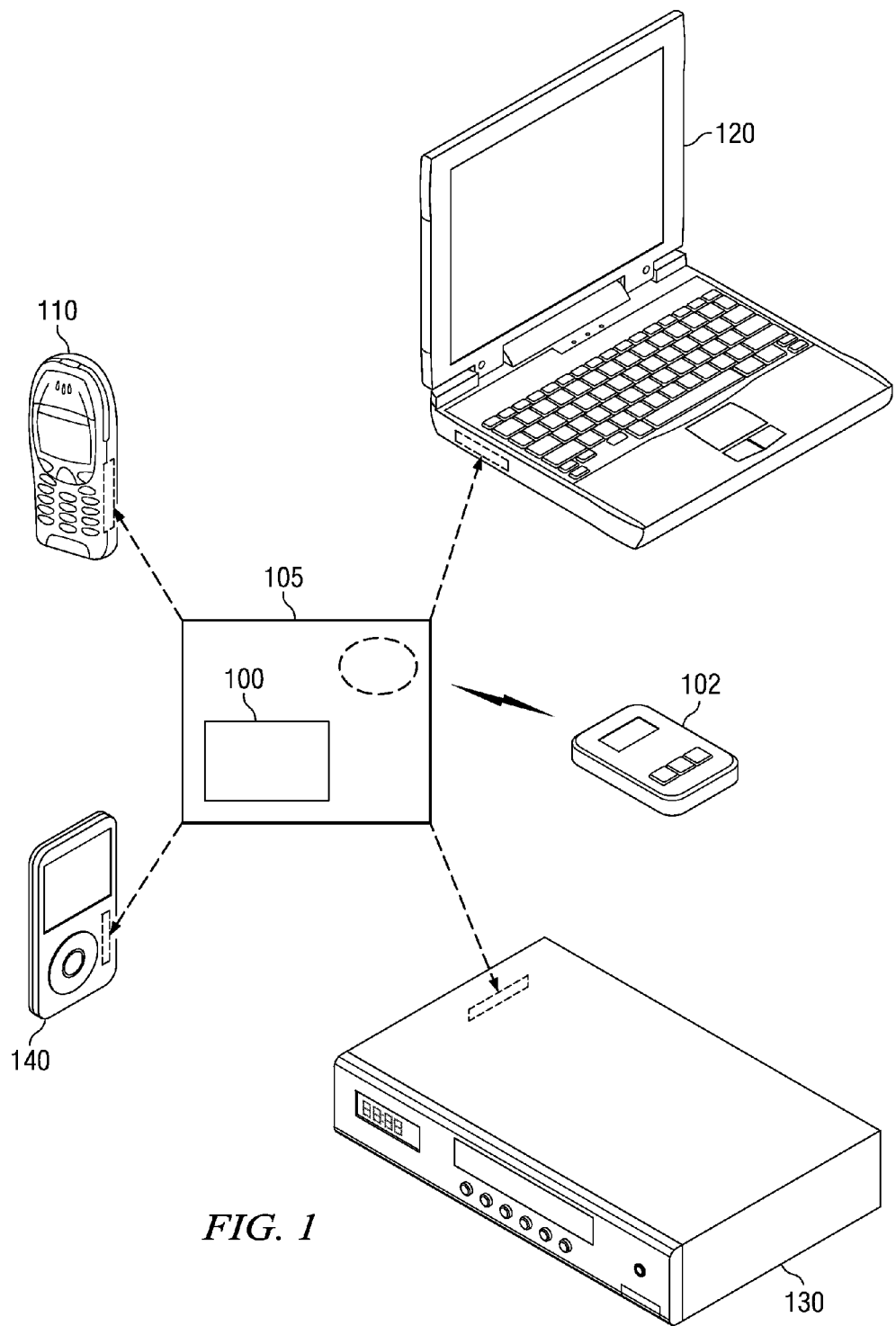
FIG. 1 is an illustrative environmental drawing illustrating various environments for utilizing implementations of the electro-migration, compensation system (EMCS).

While the electromigration compensation system is susceptible to various modifications and alternative forms, specific embodiments have been shown by way of example in the drawings and subsequently are described in detail. It should be understood, however, that the description herein of specific embodiments is not intended to limit the electromigration compensation system to the particular forms disclosed. In contrast, the intention is to cover all modifications, equivalents, and alternatives falling within the spirit and scope of the electromigration compensation system as defined by this document.

DETAILED DESCRIPTION OF EMBODIMENTS

As used in the specification and the appended claim(s), the singular forms "a," "an" and "the" include plural referents unless the context clearly dictates otherwise. Similarly, "optional" or "optionally" means that the subsequently described event or circumstance may or may not occur, and that the description includes instances where the event or circumstance occurs and instances where it does not.

FIG. 1 is an illustrative environmental drawing illustrating various environments for utilizing implementations of the electromigration, compensation system (EMCS) 100. In an integrated circuit 105, electromigration, or EM is atomic flux caused by an electrical current in metal interconnects or leads. EM divergence at a site, such as a node, can cause interconnect failure resulting from increasing lead resistance or circuit shorting. EMCS 100 compensates for this divergence and produces more robust integrated circuits, and consequently more robust devices. For example, devices 110-140 all include some type of integrated circuit 105 that is made more robust by the presence of the EMCS 100. In a second implementation, EMCS 102 may be external to the integrated circuit 105 and used assessing the susceptibility of this circuit to electromigration failure.

Figure 2A:
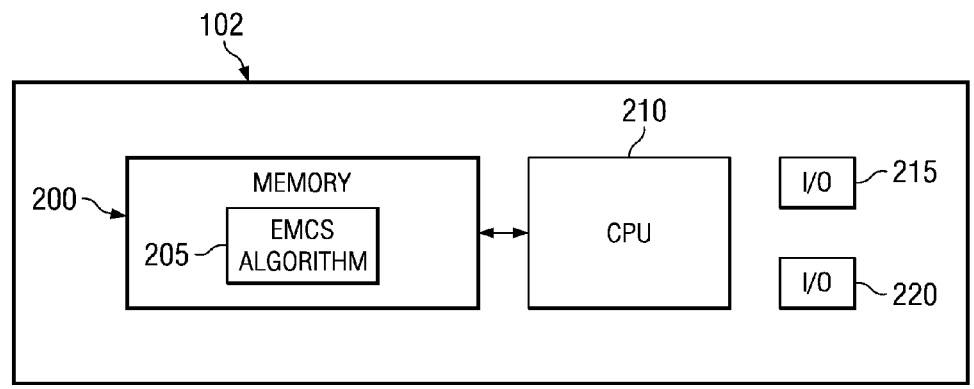
FIG. 2A is a block diagram for an implementation of the EMCS.

FIG. 2A is a block diagram for an implementation of the EMCS 102. In this implementation, the EMCS 102 may be a part of a design system for the integrated circuit 105. For example, the EMCS 102 may include an EMCS algorithm 205 within a memory 205 that runs instructions for assessing the susceptibility of the integrated circuit 105 for failure due to EM divergence. In addition to assessing the susceptibility, this algorithm may make and implement compensatory recommendations for substantially reducing electromigration, which consequently makes the integrated circuit 105 more robust. Other components such as a CPU 210, and Input/output ports 215-220 may facilitate the assessment done by the EMCS algorithm 205. More details regarding the EMCS algorithm 205 are described with regard to subsequent figures.

With the EMCS algorithm 205, it may be implemented within software as an ordered listing of executable instructions for implementing logical functions that can be embodied in any computer-readable medium. This medium may be for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer-readable medium can be, for example, but, not limited to, an electronic, magnetic, optical, electromagnetic, infrared, or semiconductor system, apparatus, device, or propagation medium. More specific examples (a non-exhaustive list) of the computer-readable medium can include the following: an electrical connection (electronic) having one or more wires, a portable computer diskette (magnetic), a random access memory (RAM), a read-only memory (ROM), an erasable programmable read-only memory (EPROM or Flash memory) (magnetic), an optical fiber (optical), and a portable compact disc read-only memory (CDROM) (optical). Note that the computer-readable medium can even be paper or another suitable medium upon which the program is printed. The program can be electronically captured, via for instance optical scanning of the paper or other medium, then compiled, interpreted or otherwise processed in a suitable manner if necessary, and then stored in a computer memory.

Figure 2B:
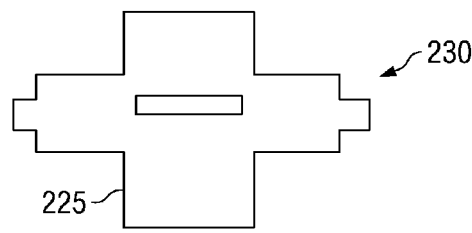
FIGS. 2B-2C are block diagrams for a different implementation of the EMCS.
Figure 2C:
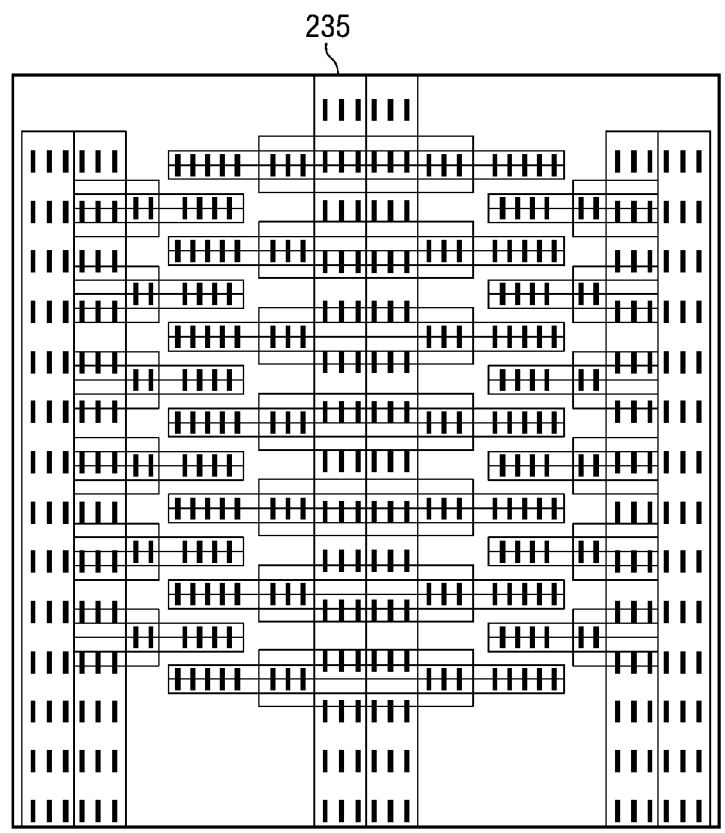

FIGS. 2B-2C are block diagrams for an implementation of the EMCS 100. As mentioned with reference to FIG. 2A, the EMCS algorithm 205 can make compensatory recommendations for reducing electromigration and producing a more robust circuit. FIG. 2B illustrates one such recommendation. In this instance, the EMCS algorithm 205 may recommend that leads 225 are designed with interwoven horizontally-tapered ends 230 for substantially reduces electromigration divergence and consequently lead resistance and circuit shorting. While this lead design orientation may be contrary to conventional wisdom because of the increased area, substantial decrease in electromigration may more than justify the slight increase in area. FIG. 2C illustrates a collection 235 of these leads with interwoven horizontally tapered ends that produce greater robustness because of reduced EM.

Figure 3A:
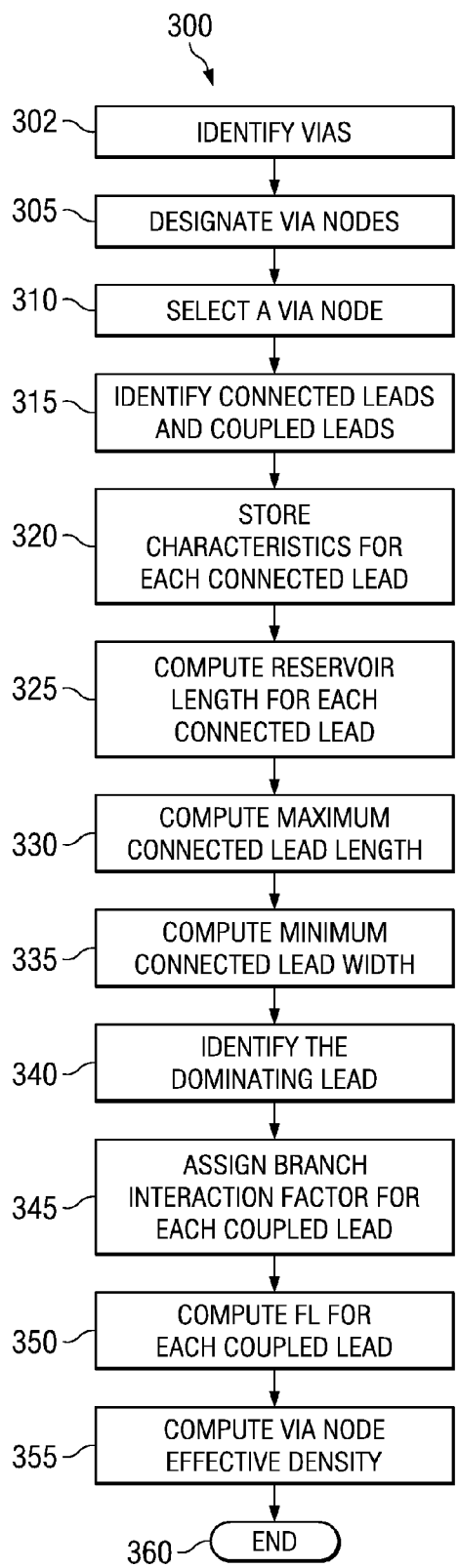
FIG. 3A and FIG. 4A are flow charts for the EMCS algorithm of FIG. 2A.

FIG. 3A and FIG. 4 are flow charts for the EMCS algorithm 205 described with reference FIG. 2A. Though each of the blocks in this figures are numbered sequentially, this represents one of many possible implementations. Numerous alternative implementations for designing the EMCS algorithm 205 may result from reordering one or more of these blocks or for performing any of these blocks in parallel.

In FIG. 3A, the flow chart 300, the flow chart 300 begins in block 302 where all of the vias are identified. The EMCS algorithm 205 focuses on a vector node check, which consequently means that a via current becomes much less of a consideration. Instead, this algorithm assesses current/flux divergence in metals either above or below a selected via. Moreover, this assessment includes directional information making it a vector, in stead of simply a scalar calculation. Hence, the EMCS 101 and the EMCS 102 is done using a via node vector.

Block 305 follows block 302. In block 305, via nodes are designated. This block generally involves designating the lead just above and the lead just below the via as the via-node. These via-nodes then serve as the basis for doing the via-node, vector check described with reference to box 302. In addition, the process for designating all of these via nodes, such as whether they are done individually, in groups or the like may vary depending on design objectives. Block 305 is followed by block 310 where one of the via nodes is selected. Blocks 315-325 may be completed for each selected node. Consequently, an alternative implementation may exist where these blocks may be completed in parallel for several nodes.

In block 315, connected leads and coupled leads are identified. Connected leads are the leads directly connected to the via-node. Coupled leads are indirectly connected to the via-node, for example through one connected lead. Block 315 is followed by 320. In this block, characteristics for each connected lead are stored. This may include storing, for example, current densities, current direction, and lead widths. Current density may include the average current, mathematical current considering EM recovery and the RMS current. Block 320 is followed by block 325, which computes the reservoir length, or lead length, for each connected lead. The reservoir length is the length from the via-node to the next via or the next pseudo-via. Pseudo via may refer to a junction of two leads in the absence of a via. Consequently, the reservoir length is different from the physical length of the lead.

Block 330 follows block 325. In the former block, the maximum lead length (Lmax) is computed for the connected leads. This may be done using all of the reservoir lengths, or lead lengths. Block 330 is followed by block 335 where the minimum width of the lead widths is computed using the stored widths of the individual connected lead widths. Block 340 follows block 335 where a dominating lead is identified. A dominating lead may refer to a lead with the highest product of the current density (j), ratioed length (Fl) and ratioed width (Fw). In addition, the dominating lead also has the maximum current flow with its own polarity. Here, j is the absolute current density of the lead; Fl is the Lead_length/Lmax; and Fw is W/Wmin.

Block 340 is followed by block 345 where a branch interaction factor is assigned for each coupled lead based on polarity. For example, leads with assist the dominating lead in that it has the same current direction may be designated, BI_assist and have a designation of −1. In contrast leads current directions that oppose the dominating lead may have a designation of −0.5. Block 350 follows block 345. In block 350, the FL for the coupled lead is computed based on polarity. Physical FL is the Lead Length/Lmax. For assisting leads, the FL=max(FLmin), which may be 0.6. For opposing leads, the FLmax may be 0.8. Finally, block 350 is followed by block 355. In this block, the via-node effective density is computed using a vector sum of the previous calculations. More specifically, the via-node effective density equals j*FLdom*Fwdom+sum(j_i*FL_i*Fw_i). The flow chart ends after block 355.

Figure 4A:
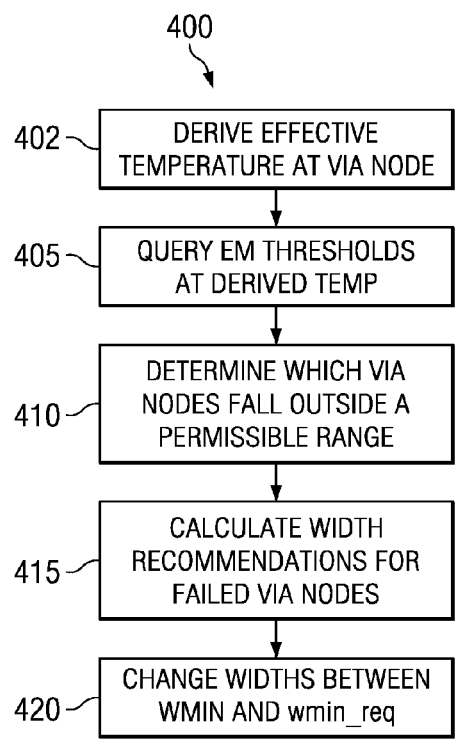

Turning now to FIG. 4A, flow chart 400 is also a part of the EMCS algorithm 205. Since increases in current density and temperature can increase electromigration, the EMCS 205 determines both the current density as described with reference to FIG. 3. The flow chart 400 focuses on both determining the temperature impact and resulting compensatory actions once the current density and temperature information is known.

Flow chart 400 begins at block 402. In this block, the effective temperature at the via-node is derived. The EM threshold will be a function of the temperature, such as the junction temperature. The via-node temperature=f(reff). For any metal segment, we define a parameter 'r' as: r=(avg current/rms current)^2; 'r' is an indicative of the extent of heating which will happen in the segment due to the RMS current flow. EM rules are a function of w, r. EM rules for this metal are a function of its width 'w' and its 'r'. EM rules are defined as:

W1, r1, allowed avg current= ...
W1, r2, allowed avg current= ...
...
W1, rn, allowed avg current= ...

Thus, for a via-node, it is important to derive what is the equivalent 'r', since each of the connecting leads has their own 'w' and 'r'.

Figure 4B:
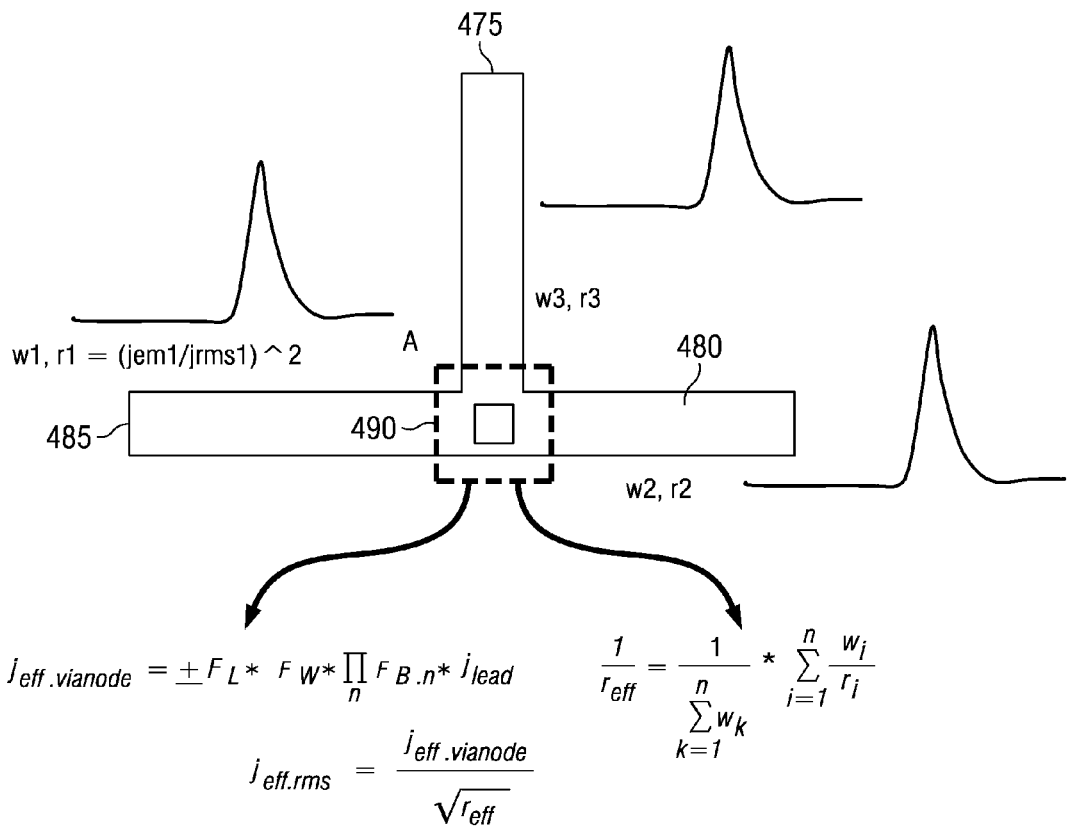
FIG. 4B is a block diagram highlighting the formulation for the effective 'r'.

FIG. 4B highlights the formulation for the effective 'r'. This figure illustrates an example of showing three leads 475-485 emanating from a node 490. As indicated, temperature is a function of reff and the following formulas enable that determination:

$$\frac{1}{r_{\mathit{eff}}} = \frac{1}{\sum_{k=1}^{n} w_k} * \sum_{i=1}^{n} \frac{w_i}{r_i}$$

$$j_{\mathit{eff}.vianode} = \pm F_L * F_W * \prod_{n} F_{B.n} * j_{lead}$$

$$j_{\mathit{eff}.rms} = \frac{j_{\mathit{eff}.vianode}}{\sqrt{r_{\mathit{eff}}}}$$

For via-node violations, width increments may be one way to fix them. Via-node violations are also a strong function of the reservoir length and thereby the via location. Via-node effective current density is a function of wmin of the lead. Even for a via-node consisting of n resistors, the final via node density is governed by wmin=min(w1 ... wn). Thus, the ratio of jeff to jeff.allowed is the ratio in which the wmin should change. Widths of all the lead, which are between wmin.old and wmin.new should change.

Block 402 is followed by block 405. In this block, the algorithm can query the EM thresholds at that temperature, which would produce the derived temperatures. Block 410 follows block 405 where the via-nodes that fall outside the permissible range are determined. This can be done using a rule comparison and declaring a pass or a fail. Block 410 is followed by block 415. In this block, the width recommendations for failed nodes may be calculated. In one implementation, the width recommendations may be sent as outputs. And, the width recommendation may be designated as wmin_req of the via node. Leads widths between wmin and wmin_req may need to change. In block 420, this change is made. The flow chart 400 ends after block 420.

Figure 5A:
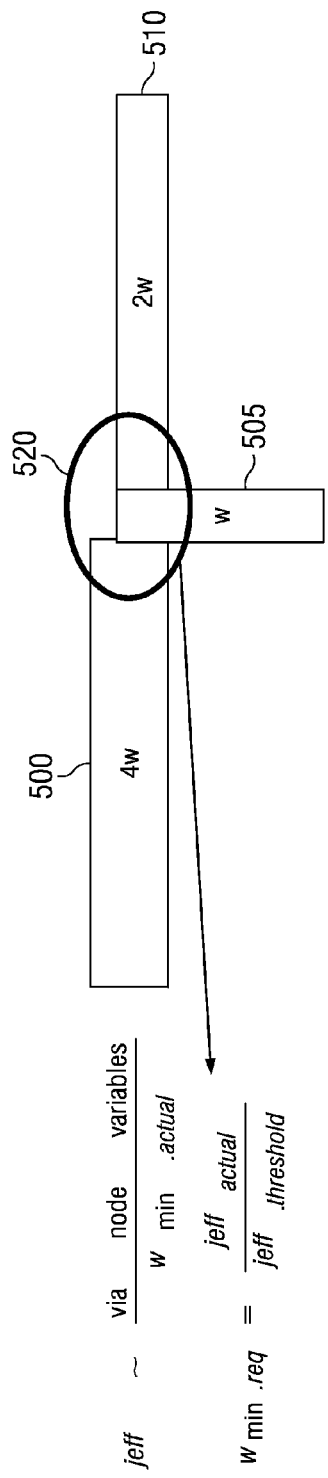
FIGS. 5A-5C illustrate leads and table for completing the compensatory action recommended by the EMCS of FIG. 1.
Figure 5B:
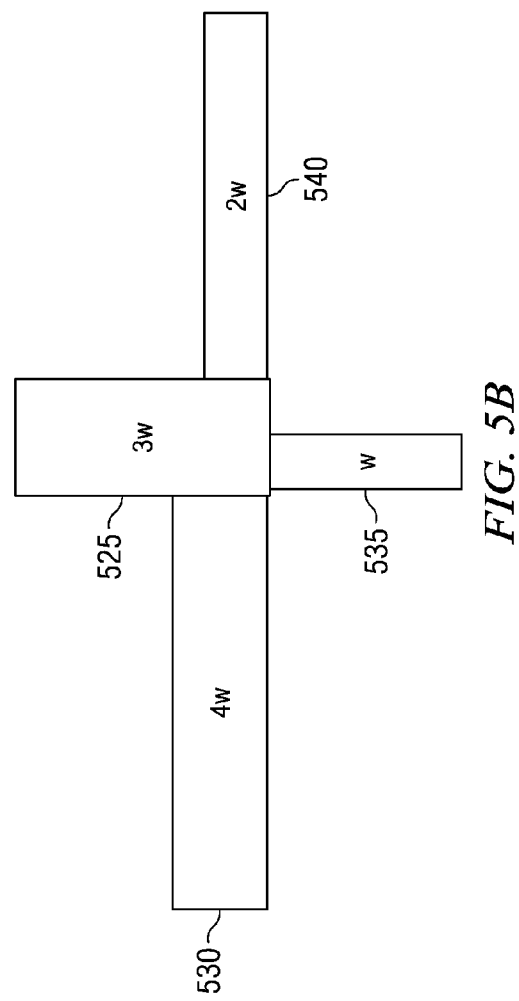
Figures 5C, 7:
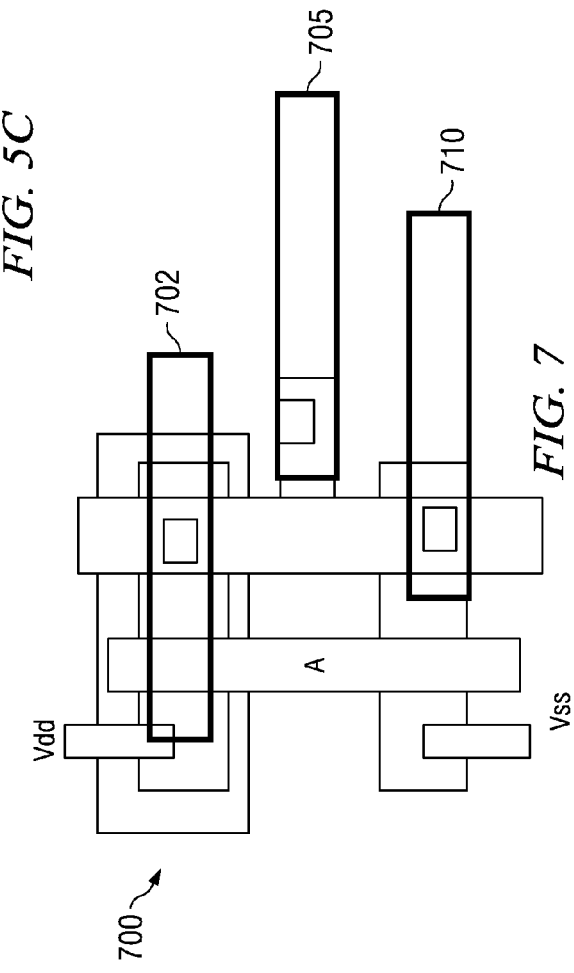
FIG. 7 is a block diagram illustrating the layout of an inverter for use with the EMCS.

FIGS. 5A-5C illustrate leads and table for use completing the compensatory actions recommend by with the EMCS of FIG. 1. FIGS. 5A-5B illustrate additional examples of leads where the EMCS may be used. To complete compensatory actions associated with node violations, or situations outside of a permissible range, it may be beneficial to determine how many connected leads have w<wmin.req. For different cases of via-node effective current density, the number of segments that need compensatory action may vary as indicated in table 545.

Figure 6:
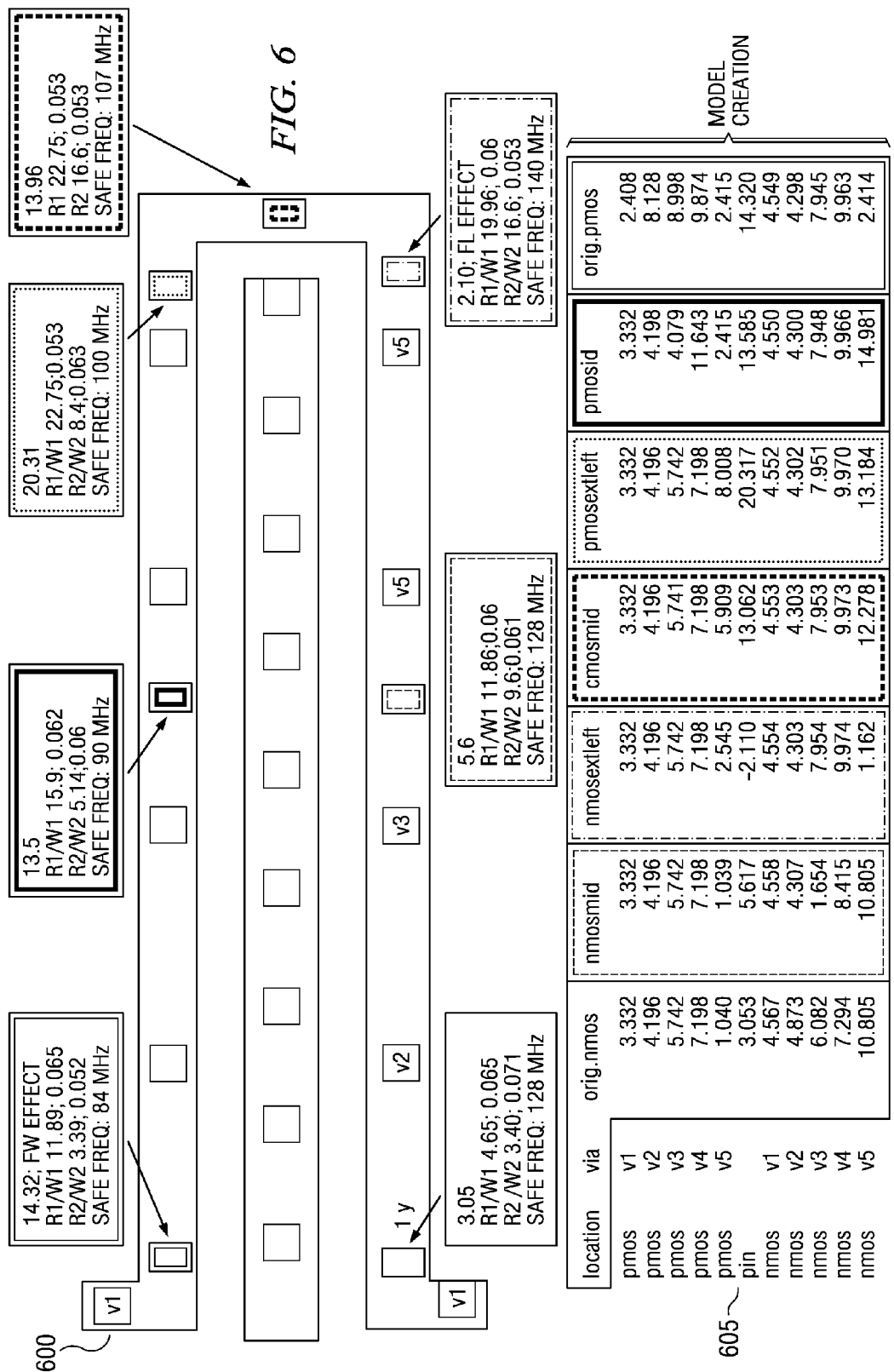
FIG. 6 is a pin arrangement and tables for an EMCS based model that uses pin location.

FIG. 6 is a pin arrangement and tables for an EMCS based model that uses pin location. For a standard cell 600, such as an inverter, NAND, NOR, the EMCS creates its EM macro model. When this cell gets used at a chip level, any operating condition at the chip level is not subject to EM because of this macro model. To implement this model, the EMCS attaches the load at different locations and a piece-wise-linear model is created for the EM properties of the cell as a function of the load_location as shown in table 605.

FIG. 7 is a block diagram illustrating the layout of an inverter 700 for use with the EMCS. When this inverter gets used at chip level, tapping by a router can be done at any location, such as locations 702-710. This tapping results in different via-node properties of the cell. Consequently, the model made aware to the tapping location.

Using the EMCS 100 may increase the lead life time by ten times over currently existing technologies. Complex implementations where there are multiple coupled leads and multiple connected leads are more efficiently handled with EMCS 100. In another implementation for filtering node check, this may be done counting the number of leads connected to the node, such as being designated with n. Then, leads can be checked manner with a threshold of j/n.

While various embodiments of the electro-migration compensation system have been described, it may be apparent to those of ordinary skill in the art that many more embodiments and implementations are possible that are within the scope of this system. Although certain aspects of the electro-migration compensation system may be described in relation to specific techniques or structures, the teachings and principles of the present system are not limited solely to such examples. All such modifications are intended to be included within the scope of this disclosure and the present electro-migration compensation system and protected by the following claim(s).

The invention claimed is:

1. A computer-implemented method for an electro-migration compensation system, comprising the steps of:
   Identifying, using a computer, vias;
   designating via nodes;
   selecting a via node;
   identifying connected leads and coupled leads;
   storing characteristics for each connected lead;
   computing a maximum connected lead length;
   computing a minimum connected lead width;
   identifying a dominating lead;
   computing a divergence length for each coupled lead; and
   computing via node effective density.

2. The computer implemented method of claim 1, further comprising:
   deriving an effective temperature for the via node;
   querying electro-migration thresholds at the effective temperature;
   determining which via nodes fall outside a permissible range; and
   calculating width recommendations for the via nodes outside the permissible range.

3. The computer implemented method of claim 2, further comprising altering a width of at least one lead of an associated integrated circuit in response calculating the width recommendations for the via nodes.

* * * * *